United States Patent [19]

Nanaumi et al.

[11] 4,278,786

[45] Jul. 14, 1981

[54] AROMATIC POLYAMIDES CONTAINING ETHER LINKAGES AND PROCESS FOR PRODUCING SAME

[75] Inventors: Ken Nanaumi, Hitachi; Fusaji Shoji, Mito; Hisashi Kohkame; Susumu Era, both of Hitachi, all of Japan

[73] Assignee: Hitachi, Ltd., Tokyo, Japan

[21] Appl. No.: 54,796

[22] Filed: Jul. 5, 1979

Related U.S. Application Data

[63] Continuation-in-part of Ser. No. 853,550, Nov. 22, 1977, abandoned, which is a continuation of Ser. No. 714,199, Aug. 13, 1976, abandoned.

[30] Foreign Application Priority Data

Aug. 15, 1975 [JP] Japan .................................. 50/98616

[51] Int. Cl.$^3$ .................... C08G 69/32; C08G 69/40
[52] U.S. Cl. .................... 528/179; 528/172; 528/182; 528/185
[58] Field of Search ............... 528/185, 172, 179, 182

[56] References Cited

U.S. PATENT DOCUMENTS

| | | | |
|---|---|---|---|
| 3,354,125 | 11/1967 | Smith et al. | 528/184 |
| 3,503,931 | 3/1970 | Radlmann et al. | 528/173 |
| 3,505,288 | 4/1970 | Bodesheim et al. | 528/185 |
| 3,663,517 | 5/1972 | Adachi | 528/183 |

FOREIGN PATENT DOCUMENTS

| | | | |
|---|---|---|---|
| 2007796 | 8/1971 | Fed. Rep. of Germany | 528/185 |
| 389243 | 7/1965 | Switzerland | 528/185 |
| 435732 | 10/1967 | Switzerland | 528/185 |
| 871578 | 6/1961 | United Kingdom | 528/185 |

*Primary Examiner*—Lester L. Lee
*Attorney, Agent, or Firm*—Craig and Antonelli

[57] ABSTRACT

A heat-resistant polyamide polymer having melt-moldability is obtained by reacting an aromatic diamine having the general formula:

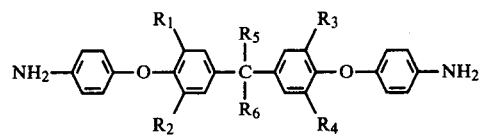

$R_1$–$R_4$: H, Cl, $CH_3$
$R_5$–$R_6$: H, $CH_3$, $CH_5$, $C_3H_7$ with an equivalent amount of aromatic dicarboxylic acid dihalide in an organic solvent in the presence of an aqueous solution of an alkali-metal hydroxide. When an equimolar mixture of terephthalic acid dihalide and isophthalic dihalide is reacted with the diamine, polyamide polymers with good melt-moldability are obtained.

14 Claims, No Drawings

AROMATIC POLYAMIDES CONTAINING ETHER LINKAGES AND PROCESS FOR PRODUCING SAME

CROSS-REFERENCE TO PRIOR APPLICATIONS

This is a continuation-in-part application of Ser. no. 853,550, filed Nov. 22, 1977 and now abandoned, which is a continuation application of Ser. No. 714,199, filed Aug. 13, 1976 and now abandoned.

BACKGROUND OF THE INVENTION (1) Field of the Invention

This invention relates to aromatic polyamides containing ether linkages and a process for producing the same. More particularly, the invention relates to ether linkage-containing aromatic polyamides having a melt flowability, namely a melt moldability and molded articles of the same, and process for producing the polyamides by polycondensation polymerization.

(2) Description of the Prior Art

It is well known that wholly aromatic polyamides have a higher melting point and a higher heat resistance than aliphatic polyamides. However, wholly aromatic polyamides are insoluble in organic solvents without the aid of a solution promoter such as LiCl or $CaCl_2$, and such polyamides have no softening point and hence, are infusible. Accordingly, their application range as molding materials is considerably limited.

U.S. Pat. Nos. 3,503,931 and 3,505,288 disclose aromatic polyamides containing ether linkages, which are soluble in polar organic solvents even in the absence of a solution promotor and have a high melting points, and also disclose a polymerization process for preparing such aromatic polyamides.

The polymerization process disclosed in these U.S. Patents comprises the step of reacting an aromatic diamine containing ether linkages with an aromatic dicarboxylic acid dihalide in a polar organic solvent at such a low temperature as not exceeding 5° C. and the step of eliminating the hydrogen halide formed at the reaction of the first step. In short, in the process of these U.S. Patents, aromatic polyamides containing ether linkages are prepared by a low temperature solution polymerization process.

In this known polymerization process, a high-molecular-weight aromatic polyamide containing ether linkages cannot be obtained unless the temperature is maintained at a low level not exceeding 5° C. at the initial stage of reaction between an aromatic diamine containing ether linkages as a first starting substance and an aromatic carboxylic acid halide as a second starting substance. Accordingly, provision of a device controlling the temperature of the reaction vessel at this level is indispensable in this known polymerization process.

Further, in this known polymerization process, an acid collector (acid acceptor) must be used for collecting the hydrogen halide formed by the reaction between the first and second starting substances, and even is such collector is used, the hydrogen halide or its salt is left in the final product, namely the intended polyamide containing ether linkages. Accordingly, an additional step is necessary for eliminating such hydrogen halide and its salt.

SUMMARY OF THE INVENTION

It is a primary object of the present invention to provide a polymerization process for the preparation of aromatic polyamides containing ether linkages, in which the synthetic reaction is initiated and advanced at a wider temperature range (i.e. −5° C. to 40° C.).

Another object of the present invention is to provide a polymerization process for the preparation of aromatic polyamides containing ether linkages, in which a particular step need not be provided for eliminating hydrogen halides formed during the synthetic reaction.

Still another object of the present invention is to provide a polymerization process for the preparation of aromatic polyamides containing ether linkages, in which the reaction can be carried out in a wider temperature range so that the reaction is easily controlled.

A further object of the present invention is to provide a polymerization process for the preparation of aromatic polyamides containing ether linkages, in which aromatic polyamides having a melt flowability, namely a melt moldability, can be obtained conveniently. The melt-moldability has never been observed in the known aromatic polyamides. Accordingly, the polyamides of the present invention expand the application fields of the heat-resistant aromatic polyamides.

In accordance with the present invention, there is provided a process for producing an aromatic polyamide polymer which comprises reacting a water insoluble aromatic diamine containing ether linkages with an aromatic dicarboxylic acid dihalide in an water-immiscible solvent in the presence of an aqueous solution of an alkali-metal hydroxide or alkali-metal carbonate at a temperature below 40° C. The polycondensation polymerization between the aromatic diamine and the aromatic dicarboxylic acid dihalide is effected by an interfacial polymerization. A hydrogen halide formed by the reaction is neutralized by the alkali-metal hydroxide or alkali-metal carbonate contained in the aqueous solution. The hydrogen halide is converted into water and a metal halide, which is dissolved in the aqueous phase. Accordingly, the metal halide and hydrogen halide are not incorporated into the resulting aromatic polyamide containing ether linkages.

DETAILED DESCRIPTION OF THE INVENTION (1) Aromatic Diamines

Aromatic diamines used in the present invention are represented by the general formula:

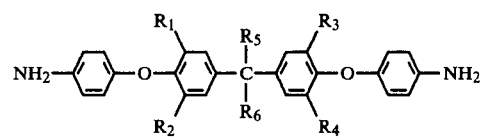

wherein $R_1$ through $R_4$ are the same or different, and are members selected from the group consisting of H, Cl and $CH_3$, and $R_5$ and $R_6$ are the same or different, and are members selected from the group consisting of H, $CH_3$, $C_2H_5$ and $C_3H_7$, the total carbon number of said $R_5$ and $R_6$ being not larger than 4. The diamines contain four aromatic rings and two ether linkages between remote aromatic rings and contain no functional (reactive) groups other than amino groups.

Examples of the diamines include:

4,4'-di(p-aminophenoxy) diphenylmethane;
4,4'-di(p-aminophenoxy)-3,3'-dichlorodiphenylmethane;
4,4'-di(p-aminophenoxy)-3,3'-dimethyldiphenylmethane;
4,4'-di(p-aminophenoxy)-3,3',5,5'-tatramethyldiphenylmethane;
4,4'-di(p-aminophenoxy)diphenylpropane-(2,2);
4,4'-di(p-aminophenoxy)-3,3'-dichlorodiphenylpropane-(2,2);
4,4'-di(p-aminophenoxy)-3,3'-dimethyldiphenylpropane-(2,2);
4,4'-di(p-aminophenoxy)-3,3',5,5'-tetramethyldiphenylpropane-(2,2); and
4,4'-di(p-aminophenoxy)-3,3'-dichlorodiphenylpentane-(3,3).

These compounds are used singly or in combination. The diamines and their synthetic process are disclosed in U.S. Pat. No. 3,505,288. Among the diamines mentioned above is most preferable 4,4'-di(p-aminophenoxy)diphenylpropane-(2,2) from the view point of its availability and good properties of polyamide polymers obtained.

The diamines, which are water-insoluble, are dispersed in an aqueous solution of an alkali-metal hydroxide, and then the resulting dispersion is mixed with a solution of an aromatic dicarboxylic acid dihalide dissolved in an water-immiscible organic solvent. The resulting mixture is agitated at a temperature of 40° C. or below for a time sufficient to produce polyamide polymers (e.g 3 to 300 minutes). The polymers are recovered from the reaction system by a suitable method such as precipitation-filtering-washing-drying.

In place of the process mentioned above, the polycondensation polymerization is effected by a process in which: The aromatic diamine is first dissolved in a water-immiscible solvent to form a first solution, and then the first solution is mixed with an aqueous solution of an alkali-metal hydroxide. Thereafter, the mixture is mixed with a second solution of an aromatic dicarboxylic acid dichloride, followed by agitating the resulting mixture at a temperature below 40° C. for a time sufficient to produce polyamide polymers. The resulting polymers are recovered in the same manner as mentioned above.

(2) Aqueous Solution of Alkali-metal Hydroxide or Alkali-metal Carbonate

An amount of the alkali-metal hydroxide or alkali-metal carbonate to be used for formation of an alkaline aqueous solution is preferably substantially equivalent to the amount of the second starting substance, namely an aromatic dicarboxylic acid dihalide. However, from 98 to 105 equivalent % of the alkali-metal hydroxide may be used based on the dihalide. Concentration of the alkali-metal hydroxide in the aqueous solution is preferably from 3% to 10% by weight. NaOH is most preferred as the alkali-metal hydroxide to be used for formation of this alkaline aqueous solution. Other suitable hydroxides are KOH and LiOH. $Na_2CO_3$ and $K_2CO_3$ may be used as an alkali-metal carbonate.

In a process in which an aromatic diamine is dispersed in an aqueous solution and the dispersion is mixed with an aromatic dicarboxylic acid dihalide dissolved in an organic solvent, an amount of the aqueous solution is preferably within a range of 30 to 50% by weight of the total amount of the aqueous solution and the organic solvent. When the amount is less than 30%, the dispersing of the diamine becomes difficult, and when the amount is larger than 50%, a molecular weight of the resulting polymer tends to be small. The decrease in molecular weight may be caused by hydrolysis of the dihalide used.

In a process in which an aromatic diamine dissolved in an organic solvent is mixed with an aqueous solution of alkali-metal, and then the mixture is mixed with an aromatic dicarboxylic acid dihalide dissolved in an organic solvent, an amount of the aqueous solution is preferably within a range of 10 to 50% by weight based on the total amount of the solvent and the aqueous solution. When the amount is less than 10%, a molecular weight of the polymer can not be sufficiently large. This result may be caused by insufficient trapping of acidic substance by the alkali-metal. When the amount exceeds 50%, the insufficient increase in molecular weight is observed. This result may be caused by hydrolysis of the dihalide.

(3) Aromatic Dicarboxylic Acid Dihalides

An aromatic dicarboxylic acid dihalide used as the second starting substance in the present invention is exemplified, for example, terephthalic acid dichloride, terephthalic acid dibromide, isophthalic acid dichloride, isophthalic acid dibromide, diphenylether-4,4'-dicarboxylic acid dichloride, diphenylether-4,4'-dicarboxylic acid dibromide, diphenylsulfone-4,4'-dicarboxylic acid dichloride, diphenylsulfone-4,4'-dicarboxylic acid dibromide, diphenyl-4,4'-dicarboxylic acid dichloride, diphenyl-4,4'-dicarboxylic acid dibromide, naphthalene-1,5-dicarboxylic acid dichloride and naphthalene-1,5-dicarboxylic acid dibromide.

The aromatic dicarboxylic acid dihalide as the second starting substance is used in an amount of 0.9 to 1.1 mole, preferably about 1 mole, per mole of the aromatic diamine containing ether linkages as the first starting substance.

It is preferred that two compounds be selected among the foregoing aromatic dicarboxylic acid dihalides and be used in combination as the second starting substance to be reacted with the first starting substance. A combination of isophthalic acid dichloride and terephthalic acid dichloride is most preferred to produce polyamide polymers with good melt-moldability.

Two aromatic dicarboxylic dihalides are preferably combined in substantially equimolar amounts. In this case, the total amount of the two aromatic dicarboxylic acid dihalides is 0.9 to 1.1 moles per mole of the aromatic diamines containing ether linkages as the first starting substance.

(4) Water-immiscible Organic Solvent

The polycondensation polymerization is effected in a water-immiscible organic solvent. The solvent hardly dissolves in water.

As such organic solvent, there can be utilized, for example, ketone type organic solvents such as cyclohexanone, di-isobutylketone, acetophenone, p-methylacetophenone and p-methoxyacetophenone, chlorinated organic solvents such as methylene chloride, dichloroethane, chloroform and other organic solvents such as nitrobenzene.

Among these solvents preferable are ketone type solvents. Particularly, cyclohexanone is most preferred because of its availability and producing high molecular weight polyamide polymers.

A concentration of the dihalides in the solution is preferably within a range between 5% and 25% by weight. Accordingly, the concentration of the total amount of the diamine and dihalides in the solvent is about 10 to 50% by weight.

The organic solvent should be chemically inert to the diamine and dihalide and the resulting polymer.

It is preferred that water be completely removed from the water-immiscible organic solvent. If such solvent is employed, a high-molecular-weight aromatic polyetheramide can be obtained as a final product.

Agitation is performed so violently that waves occur on the liquid surface.

(5) Polyamide Polymer

As the polycondensation polymerization proceeds, a polyamide polymer precipitates from the liquid phase. As has been described hereinbefore, contaminants including hydrogen halide, alkali-metal halide and alkali-metal hydroxide or alkali-metal carbonate, which are all water soluble, are freed from the resulting polymer. In order to effect the precipitation of the polyamide polymer, a suitable precipiting agent such as methanol, ethanol or acetone is added to the liquid phase.

The polyamide polymers of the present invention possess the following characteristics:

(i) Reduced viscosity ($\eta sp/c$) of 0.3 to 1.5 dl/g.
(ii) Initial weight loss temperature (heat-resistance) of 380° C. or above.
(iii) Initial flow temperature (melt-moldability) of at least 80° C. lower than the initial weight loss temperature.

When a reduced viscosity of the polymer is less than 0.3 dl/g, heat-resistance and mechanical properties of the polymer are insufficient. On the other hand, when the reduced viscosity exceeds 1.5 dl/g, molding of the polymer becomes difficult.

In general, the higher the initial weight loss temperature of a polymer, the better the heat resistance of the polymer. Particularly, when a polymer is used as an electrical insulating material such as an insulator for electric wire, the polymer should have an initial weight loss temperature as high as possible. The polyamide polymer of the invention, which has an initial weight loss temperature of 380° C. or above can, therefore, be utilized as an electrical insulating material of a high heat resistive grade.

It is remarkable that the polyamide polymers of the present invention exhibit an initial flow temperature of at least 80° C., preferably 100° C. lower than the initial weight loss temperature. This means that the polyamide polymers can easily be melt-molded. It has been a common knowledge that wholly polyamide polymers are impossible or almost impossible to melt-mold because of their high initial flow temperature and high crystallization. The polyamide polymers of the present invention, which have high initial weight loss temperatures and low initial weight loss temperatures, are unique in their good melt-moldability.

(6) Definitions and Measuring Methods (i) Reduced viscosity ($\eta sp/c$) represents a molecular weight or polymerization degree. It is measured by dissolving a polymer in a concentration of 0.1 g/dl in N,N-dimethylformamide in a thermostat vessel maintained at 30° C.

(ii) Initial weight loss temperature at which weight of a polymer begins to decrease due to its decomposition represents heat stability of a polymer. The initial weight loss temperature was measured by using a thermobalance manufactured by Shinku-Riko Co. (TGD-3000). In this measurement, a heating rate was 5° C./min.

(iii) Initial flow temperature at which a polymer exhibits flowability under pressure was measured by using a Koka-type flow tester manufactured by Shimazu Seisakusho. A nozzle size was 1 mm in diameter × 2 mm long, a load was 50 kg/cm², and a heating rate was 3° C./min.

(iv) Glass transition temperature has a relation to heat-distortion temperature and a dependency of mechanical properties on temperature. The glass transition temperature measured by using a thermomechanical analyzer (TMA-1500, manufactured by Shinku-Riko Co.) at a heating rate of 2° C./min. is closely related to an operating temperature range.

(7) Modifications

In the present invention, a part of the aromatic diamine containing ether linkages may be replaced by another type of aromatic diamines. In this case, such another type of aromatic diamines are used in an amount of up to 50 mole % based on the total amount of aromatic diamine containing ether linkages and the another type aromatic diamines.

The another type aromatic diamines include mono- and polyaromatic diamines such as m-phenylene diamine, p-phenylene diamine, 4,4'-diaminodiphenylmethane, 4,4'-diaminodiphenylether, 4,4'-diaminodiphenylsulfone, 4,4'-diaminodiphenylpropane-(2,2), 4,4'-diaminodiphenylsulfide, 1,5-diaminonaphthalene, 4,4'-diaminodiphenylethane, m-tolylenediamine, p-tolylenediamine, 3,4'-diaminobenzanilide, etc.

When the amount of the another type aromatic diamines exceeds 50 mole %, melt-moldability of the resulting polyamide polymers may be deteriorated.

Further, a part of the diamine component may be replaced by aliphatic diamines so as to improve or modify the melt-moldability. The aliphatic diamines include hexamethylenediamine, heptamethylenediamine, p-xylylenediamine, m-xylylenediamine, etc. The amount of the aliphatic diamines should be controlled to at most 30 mole %, preferably 10 mole % based on the total diamine components so as to avoid the excessive degrading of heat-resistance of the resulting polyamide polymers.

(8) Applications

Aromatic polyamides containing ether linkages, prepared according to the polymerization process of the present invention, can be used in the following fields.

(i) By utilizing the melt flowability, they can be molded into housing materials of electric and automobile parts as they are. Namely, they can be used as engineering plastic materials and electrically insulating materials.

(ii) By utilizing a high solubility in non-protonic polar organic solvents, they can be used as electrically insulating varnishes and for production of films and fibers in the form dissolved in such solvents.

The present invention will now be described by reference to the following Examples that by no means limit the scope of the invention.

EXAMPLE 1

A three-neck 200 cc-capacity flask equipped with an agitator and a thermometer was charged with 60 ml of water, and 0.8 g of NaOH was dissolved in water. Then, 4.10 g of 4,4'-di(p-aminophenoxy)diphenylpropane-(2,2) was added and dispersed under agitation. A solution of 2.03 g of isophthalic acid dichloride in 50 ml of cyclohexanone was quickly added to the resulting dispersion, and the mixture was violently agitated at 40° C. The agitation was continued for 30 minutes, and the liquid reaction mixture was transferred into a separating funnel and the cyclohexanone layer was added to methanol. The precipitate was recovered by filtration and dried to obtain an aromatic polyamide containing ether linkages, which has a reduced viscosity ($\eta sp/c$) of 0.81 dl/g.

When an initial weight loss temperature was measured by using a thermobalance, it was found that no weight loss was observed at temperatures of up to 405° C. An initial flow temperature of the polymer was 300° C. The tensile strength of a melt-molded article prepared from this aromatic polyamide was 840 Kg/cm$^2$.

EXAMPLE 2

The same three-neck flask as used in Example 1 was charged with 60 ml of water and 0.8 g NaOH to form an alkaline aqueous solution. Then, 4.10 g of 4,4'-di(p-aminophenoxy)diphenylpropane-(2,2) was added to the solution and dispersed therein under agitation. Then, a solution of 1.01 g of terephthalic acid dichloride and 1.02 g of isophthalic acid dichloride in 50 ml of cyclohexanone was quickly added to the dispersion and the mixture was violently agitated at 40° C. The reaction was conducted for 60 minutes, and the liquid reaction mixture was treated in the same manner as described in Example 1. The resulting aromatic polyamide containing ether linkages had a reduced viscosity ($\eta$ sp/c) of 1.28 dl/g.

A weight loss temperatures of the polymer was above 385° C. An initial flow temperature of the polymer was 300° C., and the tensile strength of the melt-molded article was 880 kg/cm$^2$.

EXAMPLE 3

The same three-neck flask as used in Example 1 was charged with 60 ml of water and 0.8 g of NaOH to form an alkaline aqueous solution. Then, 4.38 g of 4,4'-di(p-aminophenoxy)-3,3', 5,5'-tetramethyldiphenylmethane was added to the aqueous solution and dispersed therein under agitation. A solution of 2.96 g of isophthalic acid dibromide in 60 ml of cyclohexanone was quickly added to the dispersion, and the reaction was conducted at room temperature (20° C.) for 30 minutes. The resulting liquid reaction mixture was treated in the same manner as described in Example 1 to obtain an aromatic polyamide containing ether linkages. The reduced viscosity ($\eta$ sp/c) of the aromatic polyamide was 0.39 dl/g. The initial weight loss temperatures of the polymer was above 380° C. The initial flow temperature of the polymer was 260° C.

EXAMPLE 4

The same three-neck flask as used in Example 1 was charged with 80 ml of water and 0.8 g of NaOH to form an alkaline aqueous solution. Then, 5.07 g of 4,4'-di(p-aminophenoxy)-3,3'-dichlorodiphenylpentane-(3,3) was added to the aqueous solution and dispersed therein under agitation. A solution of 2.95 g of diphenylsulfone-4,4'-dicarboxylic acid dichloride in 60 ml of dibutylketone was quickly added to the dispersion, and the reaction was conducted at 20° C. for 120 minutes. The resulting liquid reaction mixture was treated in the same manner as described in Example 1 to obtain an aromatic polyamide containing ether linkages. The reducing viscosity ($\eta$ sp/c) of the aromatic polyamide was 0.32 dl/g. The initial weight loss temperatures of the polymer was 350° C. The initial flow temperature was 270° C. The relatively low initial weight loss temperature of the polymer is caused by reacting an excess amount of the diamine used. The excess diamine suppresses the increase in the polymerization degree.

EXAMPLE 5

The same three-neck flask as used in Example 1 was charged with 60 ml of water and 0.8 g of NaOH to form an alkaline aqueous solution. Then, 4.10 g 4,4'-di(p-aminophenoxy)diphenylpropane-(2,2) was added to the aqueous solution and dispersed therein under agitation. A solution of 2.78 g of naphthalene-1,5-dicarboxylic acid dichloride in 60 ml of acetophenone was quickly added to the dispersion, and the reaction was conducted at 40° C. for 60 minutes. The resulting liquid reaction mixture was treated in the same manner as described in Example 1 to obtain an aromatic polyamide containing ether linkages. The reduced viscosity ($\eta$ sp/c) of the aromatic polyamide was 0.41 dl/g. The initial weight loss temperatures of the polymer was above 372° C. The initial flow temperature of the polymer was 280° C.

EXAMPLE 6

The same three-neck flask as used in Example 1 was charged with 70 ml of water and 0.8 g of NaOH to form an alkaline aqueous solution. Then, 2.05 g of 4,4'-di(p-aminophenoxy)diphenylpropane-(2,2) and 2.33 g of 4,4'-di(p-aminophenoxy)-3,3', 5,5'-tetramethyldiphenylpropane-(2,2) were added to the aqueous solution and dispersed therein under agitation. A solution of 1.62 g of isophthalic acid dichloride and 0.41 g of tetrephthalic acid dichloride in 40 ml of methylene chloride was quickly added to the dispersion, and the reaction was conducted at 40° C., for 60 minutes. The resulting liquid reaction mixture was treated in the same manner as described in Example 1 to obtain an aromatic polyamide containing ether linkages. The reduced viscosity ($\eta$ sp/c) of the aromatic polyamide was 1.13 dl/g. The initial weight loss temperature and initial flow temperature of the polymer was above 382° C. and 285° C., respectively.

EXAMPLE 7

The same three-neck flask as used in Example 1 was charged with 60 ml of water and 0.8 g of NaOH to form an alkaline aqueous solution. Then, 3.28 g of 4,4'-di(p-aminophenoxy)diphenylpropane-2,2 and 0.22 g of m-phenylene diamine were added to the aqueous solution and dispersed therein under agitation. A solution of 2.03 g of isophthalic acid dichloride in 50 ml of cyclohexanone was quickly added to the dispersion, and the reaction was conducted at 40° C. for 60 minutes. The resulting liquid reaction mixture was treated in the same manner as described in Example 1 to obtain an aromatic polyamide containing ether linkages. The reduced viscosity of the aromatic polyamide was 1.02 dl/g. The initial weight loss temperature and initial flow temperature of the polymer were above 400° C. and 300° C., respectively.

EXAMPLE 8

The same three-neck flask as used in Example 1 was charged with 60 ml of water and 0.8 g of NaOH to form an alkaline aqueous solution. Then, 3.26 g of 4,4'-di(p-aminophenoxy)-3,3', 5,5'-tetramethyldiphenylpropane-(2,2) and 0.6 g of 4,4'-diaminodiphenyl ether were added to the aqueous solution and dispersed therein under agitation. A solution of 2.03 g of isophthalic acid dichloride in 50 ml of cyclohexanone was quickly added to the dispersion, and the reaction was conducted at 40°

C. for 180 minutes. The resulting liquid reaction mixture was transferred into a separating funnel, and the organic layer was recovered and added into acetone to precipitate the resulting polymer. The precipitate was recovered by filtration and dried to obtain an aromatic polyamide containing ether linkages. The reduced viscosity of the aromatic polyamide was 1.32 dl/g. The initial weight loss temperature and initial flow temperature of the polymer were above 395° C. and 305° C., respectively.

EXAMPLE 9

A three-neck 300 cc-capacity flask equipped with an agitator and a thermometer was charged with 9.84 g of 4,4'-di(p-aminophenoxy)diphenylpropane-(2,2) and 1.20 g of 4,4'-diaminodiphenylether, 2.40 g of NaOH and 45 ml of water, and the mixture was agitated to form a dispersion. A solution of 4.06 g of isophthalic acid dichloride and 2.03 g of terephthalic acid dichloride in 150 ml of cyclohexanone was quickly added to the dispersion, and the reaction was conducted at room temperature for 180 minutes. The resulting liquid reaction mixture was treated in the same manner as described in Example 1 to obtain an aromatic polyamide containing ether linkages. The reduced viscosity of the aromatic polyamide was 0.75 dl/g. The initial weight loss temperature and initial flow temperature were above 410° C. and 265° C., respectively.

EXAMPLE 10

In a three-neck 500 cc-capacity flask, there was prepared a dispersion comprising 9.58 g of 4,4'-di(p-aminophenoxy)-3,3'-dichlorodiphenylpropane-(2,2) and 1.16 g of hexamethylene diamine, 60 ml of water and 2.40 g of NaOH. A solution of 3.05 g of isophthalic acid dichloride and 3.04 g of terephthalic acid dichloride in 200 ml of p-methoxyacetophenone was quickly added to the solution, and the reaction was conducted at 10° C. for 300 minutes. The resulting liquid reaction mixture was treated in the same manner as described in Example 1 to obtain an aromatic polyamide containing ether linkages. The reduced viscosity of the aromatic polyamide was 1.03 dl/g. The initial weight loss temperature and initial flow temperature of the polymer were above 350° C. and 245° C., respectively.

EXAMPLE 11

In the same three-neck flask as used in Example 9, there was prepared a dispersion comprising 11.46 g of 4,4'-di(p-aminophenoxy) diphenylpropane-(2,2) 90 ml of water and 2.40 g of NaOH. A solution of 3.05 g of isophthalic acid dichloride 3.04 g of terephthalic acid dichloride in 150 ml of cyclohexanone was quickly added to the dispersion, and the reaction was conducted at 20° C. for 300 minutes. The resulting liquid reaction mixture was treated in the same manner as described in Example 1 to obtain an aromatic polyamide containing ether linkages. The reduced viscosity of the aromatic polyamide was 0.79 dl/g. The initial weight loss temperature and initial flow temperature of the polymer were above 450° C. and 268° C., respectively.

EXAMPLE 12

In the same three-neck flask as used in Example 10, there was prepared a dispersion comprising 6.99 g of 4,4'-di(p-aminophenoxy)-3,3', 5,5'-tetramethyl diphenylpropane-(2,2), and 2.07 g of m-xylylene diamine, 60 ml of water and 2.40 g of NaOH. A solution of 3.05 g of isophthalic acid dichloride 3.04 g of terephthalic acid dichloride in 200 ml of diisobutylketone was quickly added to the dispersion, and the reaction was conducted at 40° C. for 240 minutes. The resulting liquid reaction mixture was treated in the same manner as described in Example 1 to obtain an aromatic polyamide containing ether linkages. The reduced viscosity of the aromatic polyamide was 0.48 dl/g. The initial weight loss temperature and initial flow temperature of the polymer were above 365° C. and 250° C., respectively.

EXAMPLE 13

In a three-neck 500 cc-capacity flask equipped with an agitator, a thermometer and a cooler, there was prepared a dispersion comprising 13.14 g of 4,4'-di(p-aminophenoxy)-3,3'-dimethyldiphenylpropane-(2,2), 90 ml of water and 2.40 g of NaOH. A solution of 4.06 g of isophthalic acid dichloride and 2.03 g of terephthalic acid dichloride in 200 ml of dichloroethane was quickly added to the solution, and the reaction was conducted at 10° C. for 300 minutes. The resulting liquid reaction mixture was treated in the same manner as described in Example 1 to obtain an aromatic polyamide containing ether linkages. The reduced viscosity of the aromatic polyamide was 0.56 dl/g. The initial weight loss temperature and initial flow temperature were above 390° C., and 258° C., respectively.

EXAMPLE 14

A three-neck 300 cc-capacity flask equipped with an agitator and a thermometer was charged with 20 ml water, and 3.8 g of NaOH was dissolved therein. Then, the aqueous solution was mixed with a solution of 16.4 g of 4,4'-di(p-aminophenoxy)diphenylpropane-(2,2) dissolved in 60 g of cyclohexanone, and the resulting mixture was stirred.

To the mixture added was a solution of 4.1 g of isophthalic acid dichloride and 4.1 g of terephthalic acid dichloride dissolved in 60 g of cyclohexanone. The resulting mixture was then agitated at a temperature of 0° to 3° C. for 3 hours. The resulting solution containing the polyamide polymer was put into methanol to precipitate the polymer. The precipitate was filtered, washed and dried.

The polymer had the reduced viscosity of 0.93 dl/g, initial weight loss temperature of above 405° C., and initial flow temperature of 285° C.

When an aqueous solution of 5.1 g of $Na_2CO_3$ dissolved in 40 g of water was used in place of NaOH in the above process, the resulting polymer had $\eta sp/c$ of 0.77 and an initial flow temperature of 260° C. Other properties of the polymer were the similar to those of the above-mentioned polymer.

EXAMPLE 15

The flask used in Example 14 was charged with 80 ml of water and 3.8 g of NaOH. To the aqueous alkaline solution added was a solution of 16.4 g of 4,4'-di(p-aminophenoxy)diphenylpropane-(2,2) dissolved in 60 g of cyclohexanone. The resulting mixture was stirred. With the mixture mixed was a solution of 4.1 g of isophthalic acid dichloride and 4.1 g of terephthalic acid dichloride dissolved in 60 g of cyclohexanone. Then, the mixture was agitated at a temperature of −5° C. to 0° C. for 3 hours.

The resulting polymer was recovered and dried in the same manner as in Example 14 to obtain a polyamide polymer having a reduced viscosity of 0.89 dl/g, initial weight loss temperature of above 400° C., and initial flow temperature of 280° C.

When an aqueous solution of 6.6 g of K$_2$CO$_3$ dissolved in 40 g of water was used in place of NaOH in the above process, the resulting polymer had ηsp/c of 0.80 and an initial flow temperature of 270° C., while other properties were similar to those of the above-mentioned polymer.

EXAMPLE 16

Using 4,4'-di(p-aminophenoxy)diphenylpropane-(2,2) and terephthalic acid dichloride and isophthalic acid dichloride, various polyamide polymers were prepared in accordance with the process of Example 14. Amounts of the respective components were changed to find the dependency of glass transition temperature (Tg, °C.), initial flow temperature (Tf, °C.) and initial weight loss temperature (Td, °C.) of the polymers on the proportions of terephthalic acid dichloride (T) and isophthalic acid dichloride (I).

The results are shown in Table 1 below.

TABLE 1

| Proportion of T to I | Tg (°C.) | Td (°C.) | Tf (°C.) |
| --- | --- | --- | --- |
| 0:100 | 210 | 405 | 290 |
| 20:80 | 215 | 405 | 265 |
| 40:60 | 218 | 407 | 259 |
| 50:50 | 219 | 407 | 260 |
| 60:40 | 222 | 407 | 261 |
| 70:30 | 224 | 408 | 270 |
| 80:20 | 227 | 410 | 281 |
| 100:0 | 240 | 410 | 327 |

Although there is no substantial change in Td in accordance with variation of the proportions of T to I, an appreciable change in Tg and a remarkable change in Tf are seen in Table 1. That is, polyamide polymers obtained from an aromatic diamine containing ether linkages and terephthalic and isophthalic acid dichlorides show good melt-moldability when the proportions of the dichlorides are within a range of from 80:20 to 20:80. Particularly, an equimolar mixture of the dihalides provides the best melt-moldability.

The dependency of Tg, Tf and Td of the polymers on reduced viscosities (ηsp/c) was studied of which results are shown in Table 2 below.

TABLE 2

| ηsp/c (dl/g) | Tg (°C.) | Td (°C.) | Tf (°C.) |
| --- | --- | --- | --- |
| 0.55 | 217 | 406 | 254 |
| 0.70 | 218 | 407 | 260 |
| 0.82 | 223 | 408 | 277 |
| 0.94 | 230 | 409 | 287 |

According to the results shown in Table 2, it can be seen that the increase in ηsp/c which represents a molecular weight or polymerization degree increases Tf. From the view point of melt-moldability, polymers having ηsp/c of about 0.7 are preferred.

What we claim is:

1. An aromatic polyamide polymer produced by polymerization of an aromatic diamine having the general formula:

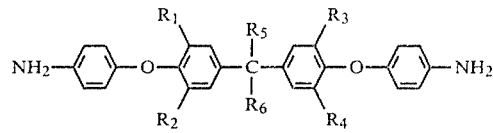

wherein R$_1$ through R$_4$ are the same or different, and are members selected from the group consisting of H, Cl and CH$_3$, and wherein R$_5$ and R$_6$ are the same or different, and are the members selected from the group consisting of H, CH$_3$, C$_2$H$_5$ and C$_3$H$_7$, the total carbon number of R$_5$ and R$_6$ being no greater than 4; with an equivalent amount of a mixture of terephthalic acid dichloride and isophthalic acid dichloride in molar proportions of from 80:20 to 20:80, said polymer having a reduced viscosity of 0.3 to 1.5 dl/g, and initial weight loss temperature of 380° C. or above, and an initial flow temperature of at least 80° C. lower than the initial weight loss temperature, whereby said aromatic polyamide polymer has melt moldability, in which said polymer is obtained by reacting said diamine and said mixture in a water-immiscible, chemically inert, organic solvent in the presence of an aqueous solution of an alkali-metal hydroxide or carbonate in an amount sufficient to neutralize an acidic substance generated in the reaction.

2. An aromatic polyamide according to claim 1, wherein said diamine is at least one member selected from the group consisting of 4,4'-di(p-aminophenoxy)-diphenylmethane; 4,4'-di(p-aminophenoxy)-3,3'-dichlorodiphenylmethane; 4,4'-di(p-aminophenoxy)-3,3'-dimethyldiphenylmethane; 4,4'-di(p-aminophenoxy)-3,3',5,5'-tetramethyldiphenylmethane; 4,4'-di(p-aminophenoxy)-diphenylpropane-(2,2); 4,4'-di(p-aminophenoxy)-3,3'-dichlorodiphenylpropane-(2,2); 4,4'-di(p-aminophenoxy)-3,3'-dimethyldiphenylpropane-(2,2); 4,4'-di(p-aminophenoxy)-3,3'-dimethyldiphenylpropane-(2,2); and 4,4'-di(p-aminophenoxy)-3,3'-dichlorodiphenylpentane-(3,3).

3. An aromatic polyamide polymer according to claim 1, wherein the mixture is an equimolar mixture of terephthalic acid dichloride and isophthalic acid dichloride.

4. An aromatic polyamide polymer according to claim 2, wherein said diamine is 4,4'-di(p-aminophenoxy)diphenylpropane-(2,2).

5. A process for preparing an aromatic polymer which comprises:
reacting an aromatic diamine having the general formula:

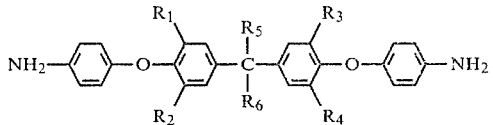

wherein R$_1$ through R$_4$ are the same or different, and are members selected from the group consisting of H, Cl and CH$_3$, and R$_5$ and R$_6$ are the same or different, and are members selected from the group consisting of H, CH$_3$, C$_2$H$_5$, C$_3$H$_7$, the total carbon number of R$_5$ and R$_6$ being no greater than 4,
with a mixture of terephthalic acid dichloride and isophthalic acid dichloride in molar proportions of from 80:20 to 20:80 dissolved in a water-immiscible organic solvent which is chemically inert to said diamine and mixture as well as to the polyamide polymer and is capable of dissolving said diamine and mixture in the presence of an aqueous solution of an alkali-metal hydroxide or carbonate in an amount sufficient to neutralize an acidic substance generated in the reaction, under agitation at a temperature of 40° C. or below for a time sufficient to provide the polyamide polymer with a reduced viscosity of 0.3 to 1.5 dl/g, an initial weight loss temperature of 380° C. or above, and an initial flow temperature of at least 100° C. lower than the initial weight loss temperature; and recovering the resulting polyamide polymer from the reaction system, whereby said polyamide polymer has a melt moldability.

6. A process for preparing an aromatic polyamide polymer according to claim 5, wherein said aromatic diamine is at least one member selected from the group consisting of 4,4'-di(p-aminophenoxy)-diphenylmethane, 4,4'-di(p-aminophenoxy)-3,3'-dichlorodiphenylmethane, 4,4'-di(p-aminophenoxy)-3,3'-dimethyldiphenylmethane, 4,4'-di(p-aminophenoxy)-3,3',5,5'-tetramethyldiphenylmethane, 4,4'-di(p-aminophenoxy) diphenylpropane-(2,2), 4,4'-di(p-aminophenoxy)-3,3'-dichlorodiphenylpropane-(2,2), 4,4'-di(p-aminophenoxy)-3,3'-dimethyldiphenylpropane-(2,2), 4,4'-di(p-aminophenoxy)-3,3', 5,5'-tetramethyldiphenylpropane-(2,2), and 4,4'-di(p-aminophenoxy)-3,3'-dichlorodiphenylpentane-(3,3).

7. A process for preparing an aromatic polyamide polymer according to claim 5, wherein the mixture is an equimolar mixture of terephthalic acid dichloride and isophthalic acid dichloride.

8. A process for preparing an aromatic polyamide polymer according to claim 5, wherein said solvent is a member selected from the group consisting of cyclohexanone, diisobutylketone, acetophenone, p-methylacetophenone, p-methoxyacetophenone, methylene dichloride, dichloroethane, chloroform and nitrobenzene.

9. A process for preparing an aromatic polyamide polymer according to claim 5, wherein up to 50% of said diamine is replaced by at least one member selected from the group consisting of p-phenylenediamine, m-phenylenediamine, 4,4'-diaminodiphenylmethane, 4,4'-diaminodiphenyl ether, 4,4'-diaminodiphenylsulfone, 4,4'-diaminodiphenyl sulfide, 4,4'-diaminodiphenylpropane-(2,2), and 1,5-diaminonaphthalene.

10. A melt-moldable aromatic polyamide polymer, which is a polycondensation product of an aromatic diamine selected from the group consisting of 4,4'-di(p-aminophenoxy)diphenylpropane-(2,2), 4,4'-di(p-aminophenoxy)-3,3',5,5'-tetramethyldiphenylmethane, 4,4'-di(p-aminophenoxy)-3,3'-dichlorodiphenylpropane-(2,2), and 4,4'-di(p-aminophenoxy)-3,3'-dimethyldiphenylpropane-(2,2), with an equivalent amount of a mixture of terephthalic acid dichloride and isophthalic acid dichloride in molar proportions of from 80:20 to 20:80, said polycondensation product having a reduced viscosity of 0.55 to 0.9, an initial weight loss temperature of 380° C. or above, and an initial flow temperature of at least 100° C. lower than the initial weight loss temperature.

11. A melt-moldable aromatic polyamide polymer according to claim 10, wherein up to 50% of said diamine is replaced by a member selected from the group consisting of m-phenylene diamine and 4,4'-diaminodiphenylether.

12. A melt-moldable polyamide polymer according to claim 10, wherein the mixture of said terephthalic acid dichloride and isophthalic acid dichloride is an equimolar mixture.

13. A melt-molded article consisting of the polyamide polymer as defined in claim 11.

14. A melt-molded article consisting of the polyamide polymer as defined in claim 12.

* * * * *